United States Patent
Shinkawa

(10) Patent No.: US 10,364,859 B2
(45) Date of Patent: Jul. 30, 2019

(54) BUSH FOR VEHICLE

(71) Applicant: HONDA MOTOR CO., LTD., Tokyo (JP)

(72) Inventor: Masaki Shinkawa, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/668,007

(22) Filed: Aug. 3, 2017

(65) Prior Publication Data

US 2018/0038438 A1    Feb. 8, 2018

(30) Foreign Application Priority Data

Aug. 4, 2016    (JP) .................. 2016-154025

(51) Int. Cl.
    *F16F 3/12*    (2006.01)
    *B60G 7/02*    (2006.01)
    (Continued)

(52) U.S. Cl.
    CPC .............. *F16F 3/12* (2013.01); *B60G 7/02* (2013.01); *F16C 17/02* (2013.01); *F16C 27/063* (2013.01);
    (Continued)

(58) Field of Classification Search
    CPC ......... F16F 3/12; F16F 15/085; F16C 27/063; F16C 33/20; F16C 2326/20; F16C 17/02;
    (Continued)

(56) References Cited

U.S. PATENT DOCUMENTS 6,082,721 A * 7/2000 Kingsley ............ F16B 11/008
                                                    267/276
6,095,563 A * 8/2000 Bushek ................. B60G 7/00
                                                    280/124.128
(Continued)

FOREIGN PATENT DOCUMENTS

CN     102454735    5/2012
CN     102951002    3/2013
(Continued)

OTHER PUBLICATIONS

Japanese Office Action dated Jan. 9, 2018, 3 pages.
Chinese Office Action with English translation dated Dec. 19, 2018, 15 pages.

*Primary Examiner* — Pamela Rodriguez
(74) *Attorney, Agent, or Firm* — Rankin, Hill & Clark LLP

(57) ABSTRACT

A bush for a vehicle includes: an inner cylindrical member; a substantially cylindrical rubber member provided outside the inner cylindrical member; and a substantially cylindrical metal spring member inserted between the inner cylindrical member and the rubber member. A gap portion for allowing the metal spring member to be elastically deformed in a radial direction of the metal spring member is provided between the inner cylindrical member and the metal spring member. The bush for a vehicle works such that when impact force belonging to a relatively low vibration frequency area or impact force resultantly accompanied with great displacement is inputted into the bush for a vehicle, mainly the rubber member absorbs vibrations; and when impact force belonging to a relatively high vibration frequency area is inputted into the bush for a vehicle, mainly the metal spring member absorbs vibrations.

7 Claims, 7 Drawing Sheets

(51) Int. Cl.
*F16C 17/02* (2006.01)
*F16C 27/06* (2006.01)
*F16C 33/20* (2006.01)
*F16F 15/08* (2006.01)
*F16C 33/08* (2006.01)

(52) U.S. Cl.
CPC .............. *F16C 33/08* (2013.01); *F16C 33/20* (2013.01); *F16F 15/085* (2013.01); *B60G 2204/143* (2013.01); *B60G 2204/41* (2013.01); *B60G 2500/22* (2013.01); *F16C 2326/05* (2013.01); *F16C 2326/20* (2013.01)

(58) Field of Classification Search
CPC .. F16C 33/08; F16C 2326/05; B60G 2204/41; B60G 2204/143; B60G 7/02; B60G 2500/22
USPC ............................ 267/30, 292, 293; 280/788
See application file for complete search history.

(56) References Cited

U.S. PATENT DOCUMENTS

| | | | |
|---|---|---|---|
| 8,505,889 | B2* | 8/2013 | Suzuki .................... B60G 3/20 267/141.1 |
| 2002/0060385 | A1* | 5/2002 | Mayerbock ............. B60G 7/02 267/293 |
| 2005/0242480 | A1 | 11/2005 | Nicholson et al. |
| 2013/0043370 | A1 | 2/2013 | Kim |

FOREIGN PATENT DOCUMENTS

| | | |
|---|---|---|
| JP | S48-308 U | 6/1973 |
| JP | H5-64545 U | 8/1993 |
| JP | 2007-331617 | 12/2007 |
| JP | 2010-159844 | 7/2010 |

\* cited by examiner

K: SPRING CONSTANT

C: VISCOSITY COEFFICIENT aK: SPRING CONSTANT
(WHERE a IS POSITIVE VALUE)

BUSH FOR VEHICLE

BACKGROUND OF THE INVENTION

1. Field of the Invention

The present invention relates, for example, to a bush for a vehicle to be mounted on a suspension arm or the like included in a vehicle such as an automobile.

2. Description of the Related Art

For example, Japanese Patent Application Publication No. 2010-159844 (hereinafter referred to as Patent Document 1) discloses a configuration of a bush to be mounted on a suspension arm or the like of an automobile. The bush of Patent Document 1 includes: an outer cylinder; an inner cylinder; an elastic body made of rubber or the like, and interposed between the outer cylinder and the inner cylinder; and an intermediate member embedded in the elastic body, and made from a resin material more rigid than the elastic body. The intermediate member is formed in a cylindrical shape to surround the inner cylinder, and includes a slit extending in an axial direction of the intermediate member. In the case of the bush of Patent Document 1, the drawing of the outer cylinder narrows the widths of the slits, reduces the diameter of the intermediate member, and thereby compresses the inner portion of the elastic body which is located inside the intermediate member. The bush of Patent Document 1 can make the rigidity of the elastic body higher (increase its spring constant), since the drawing of the outer cylinder can make the number of parts smaller than before, and concurrently can compress the inner and outer portions of the elastic body which are located respectively inside and outside the intermediate member.

In the rubber used in the bush of Patent Document 1, there is a trade-off between the spring constant and the performance of damping vibrations which occur, for example, when a tire travels over a bump on a road surface (hereinafter referred to as a "vibration damping performance"). In other words, the vibration damping performance of the rubber becomes higher as the spring constant becomes smaller, and becomes lower as the spring constant becomes higher.

Furthermore, in the rubber, the spring constant becomes higher as the vibration frequency becomes higher. In other words, in the rubber, the vibration damping performance becomes lower as the vibration frequency becomes higher. If as mentioned above, the vibration damping performance of the rubber becomes lower, the performance of suppressing noises and vibrations (hereinafter referred to as an "NV performance) becomes lower, and the ride comfort is worsened.

SUMMARY OF THE INVENTION

The present invention has been made to solve the above problems and makes it an object thereof to provide a bush for a vehicle capable of: securing the NV performance regardless of whether the vibration frequency is high or low; and maintaining good ride comfort.

In order to achieve the above object, the present invention is a bush for a vehicle which includes: a cylindrical member; a substantially cylindrical rubber member provided inside or outside the cylindrical member; and a substantially cylindrical metal spring member inserted between the cylindrical member and the rubber member. The bush for a vehicle employs a configuration in which a gap portion for allowing the metal spring member to be elastically deformed in a radial direction of the metal spring member is provided between the cylindrical member and the metal spring member.

According to the present invention, since the gap portion for allowing the metal spring member to be elastically deformed in the radial direction of the metal spring member is provided between the cylindrical member and the metal spring member, mainly the rubber member absorbs vibrations when impact force belonging to a relatively low vibration frequency area or impact force resultantly accompanied with great displacement is inputted into the bush for a vehicle; and mainly the metal spring member absorbs vibrations when impact force belonging to a relative high vibration frequency area is inputted into the bush for a vehicle.

According to the present invention, the NV performance can be secured regardless of whether the vibration frequency is high or low, and good ride comfort can be maintained.

According to the present invention, it is possible to obtain a bush for a vehicle capable of: securing the NV performance regardless of whether the vibration frequency is high or low; and maintaining good ride comfort.

DETAILED DESCRIPTION OF THE EMBODIMENTS

Embodiments of the present invention will be hereinafter described in detail with reference to the accompanying drawings depending on the necessity.

It should be noted that in principle, members having a common function, or members having functions corresponding to each other are denoted by a common reference sign in the following drawings. Furthermore, sizes and shapes of members are schematically shown with modification or exaggeration for the sake of explanation from time to time.
(Configuration of a Bush for a Vehicle 11A-1 of a First Embodiment of the Present Invention)

Figure 1:
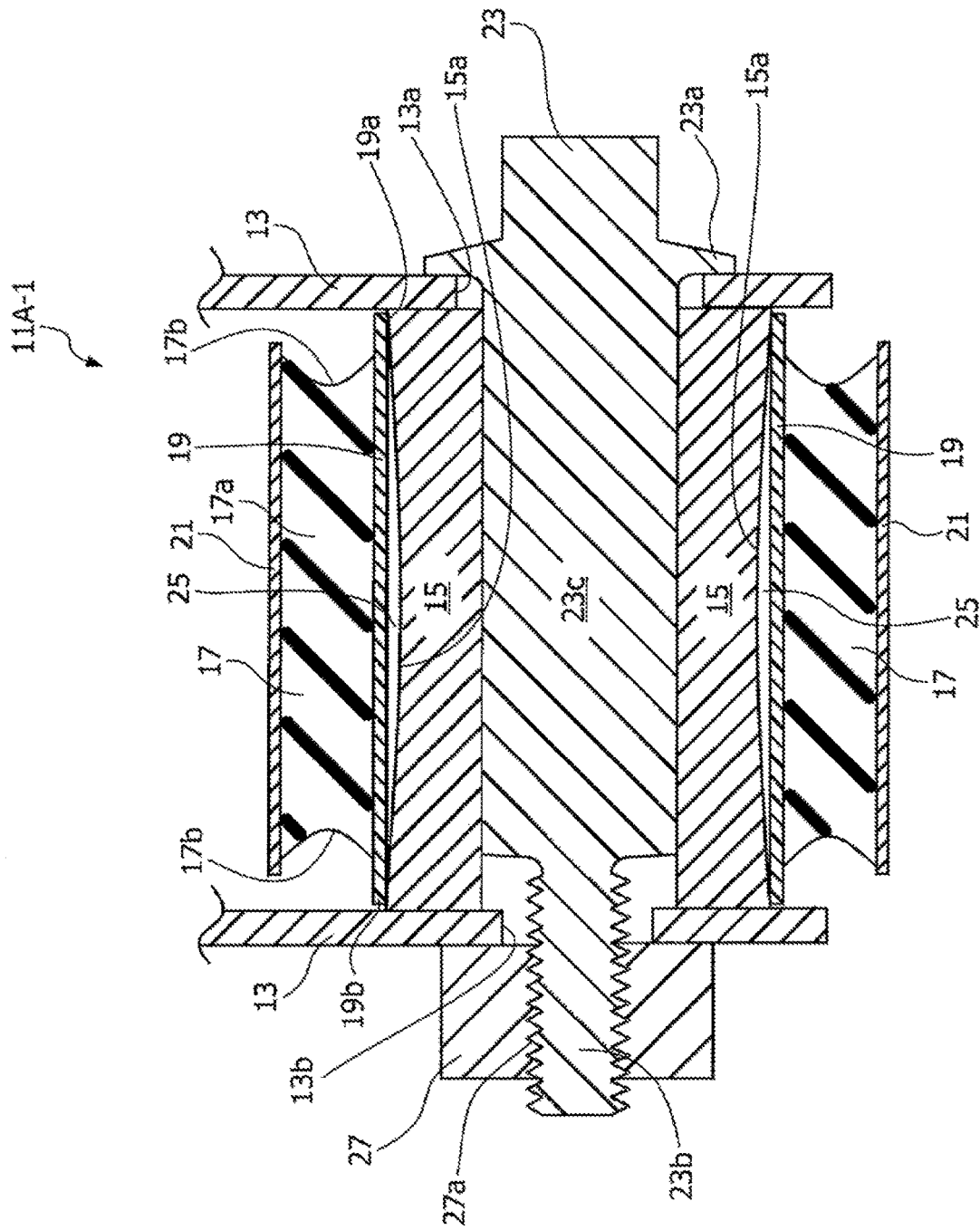
FIG. 1 is a longitudinal cross-sectional diagram illustrating how a bush for a vehicle of a first embodiment of the present invention is mounted on a yoke portion of a suspension arm.

Referring to FIG. 1, descriptions will be provided for a configuration of a bush for a vehicle 11A-1 of a first embodiment of the present invention by citing an example of how the bush for a vehicle 11A-1 is mounted, for example, on a yoke portion 13 provided to one end of a suspension arm (not illustrated) included in a suspension apparatus (not illustrated) for a vehicle (this is the case with the following embodiments). FIG. 1 is a longitudinal cross-sectional diagram illustrating how the bush for a vehicle 11A-1 of the first embodiment of the present invention is mounted on the yoke portion 13 of the suspension arm. As illustrated in FIG. 1, the bush for a vehicle 11A-1 of the first embodiment of the present invention includes: an inner cylindrical member 15; a substantially cylindrical rubber member 17 provided outside the inner cylindrical member 15; a substantially cylindrical metal spring member 19 inserted between the inner cylindrical member 15 and the rubber member 17. An outer cylindrical member 21 is provided outside the rubber member 17 in away that makes the outer cylindrical member 21 cover the rubber member 17.

The yoke portion 13 of the suspension arm is formed in the shape of the letter U. Mounting holes 13a, 13b through to insert a bush mounting bolt 23 are opened in wall portions of the yoke portion 13 which face each other.

The inner cylindrical member 15 is a pipe-shaped rigid member made of a metal such as iron or an aluminum alloy. As illustrated in FIG. 1, a taper constricted portion 15a is formed on the outer peripheral surface of the inner cylindrical member 15, and is tapered at its center portion such that its diameter becomes gradually slightly smaller from its axial end portions toward its center portion. As for the bush for a vehicle 11A-1 of the first embodiment, the inner cylindrical member 15 corresponds to the "cylindrical member" of the present invention.

The existence of the constricted portion 15a forms a gap portion 25 between the outer peripheral surface of the inner cylindrical member 15 on which the taper constricted portion 15a is formed and the flat-shaped inner peripheral surface of the metal spring member 19. The gap portion 25 is a space for allowing the metal spring member 19 to warp in the radial direction, for example, when impact force is inputted into the outer cylindrical member 21 of the bush for a vehicle 11A-1. This makes it possible for the metal spring member 19 to exert its spring force in accordance with a spring constant without any obstacles. Incidentally, a fluid such as machine oil may be enclosed in the gap portion 25. This configuration makes it possible to adjust the spring constant of the metal spring member 19.

The rubber member 17 plays a roll of damping the impact force by generating reaction force in accordance with a spring constant of the rubber member 17 (how to set the spring constant of the rubber member 17 will be described later in details), for example, when the impact force is inputted into the outer cylindrical member 21 of the bush for a vehicle 11A-1. The rubber member 17 is vulcanization-bonded to the outer cylindrical member 21 and the metal spring member 19. A pair of hollow portions 17b for adjusting the spring constant of the rubber member 17 are formed in the two axial ends of a main body portion 17a of the rubber member 17 which is substantially cylindrical. Incidentally, either or both of the pair of hollow portions 17b may be omitted.

The metal spring member 19 is a pipe-shaped member made of an appropriate metal which has a predetermined spring constant (how to set the spring constant of the metal spring member 19 will be described later in details). The plate thickness of the metal spring member 19 may be set at an appropriate value based on an experiment and a simulation for the purpose of achieving an intended spring constant. One end 19a of the metal spring member 19 is welded and fixed to the outer peripheral surface of the inner cylindrical member 15. The other end 19b of the metal spring member 19 is provided to the inner cylindrical member 15 with the assistance of a mechanism (not illustrated), such as a key groove, which inhibits rotational movement of the metal spring member 19 and allows movement of the metal spring member 19 in the axial direction.

Incidentally, the metal spring member 19 may include slits formed therein to be arranged at predetermined intervals in the circumferential direction, and extend in the axial direction. This configuration makes it possible to adjust the spring constant of the metal spring member 19.

Like the inner cylindrical member 15, the outer cylindrical member 21 is a pipe-shaped rigid member made of a metal such as iron or an aluminum alloy.

The bush mounting bolt 23 includes a flange portion 23a in one end thereof, and an external thread portion 23b on the other end thereof. The flange portion 23a and the external thread portion 23b of the bolt 23 are integrally formed with a column-shaped shaft portion 23c in between. The outer diameter of the shaft portion 23c is formed slightly less than the inner diameter of the inner cylindrical member 15. This makes it possible to smoothly insert the shaft portion 23c of the bolt 23 through the inner circumferential space of the inner cylindrical member 15 while bringing the outer peripheral surface of the shaft portion 23c into slide contact with the inner peripheral surface of the inner cylindrical member 15.

The bush for a vehicle 11A-1 is mounted on the yoke portion 13 of the suspension arm by following a procedure described below. To begin with, with the bush for a vehicle 11A-1 placed at a predetermined mounting position on the yoke portion 13, the shaft portion 23c of the bolt 23 is inserted through the mounting hole 13a of the yoke portion 13, the inner circumferential space of the inner cylindrical member 15, and the mounting hole 13b of the yoke portion 13 in this order. Thereafter, an internal thread portion 27a of a nut 27 is screwed onto the external thread portion 23b of the bolt 23, and the nut 27 is fastened to the bolt 23 with the yoke portion 13 interposed between the nut 27 and the flange portion 23a of the bolt 23.

With the bush for a vehicle 11A-1 mounted on the yoke portion 13 of the suspension arm, the outer cylindrical member 21 is rigidly connected to a vehicle body (not illustrated). Meanwhile, the inner cylindrical member 15 is linked to a wheel (not illustrated) via the suspension arm. The bush for a vehicle 11A-1 located between the wheel and the vehicle body via the suspension arm performs a function of: damping an input caused by a bump and the like on the road surface; and easing an output to be transmitted to the vehicle body. Detailed descriptions will be later provided for how the bush for a vehicle 11A-1 works.
(Configuration of a Bush for a Vehicle 11A-2 of a Modification of the First Embodiment of the Present Invention)

Figure 2:
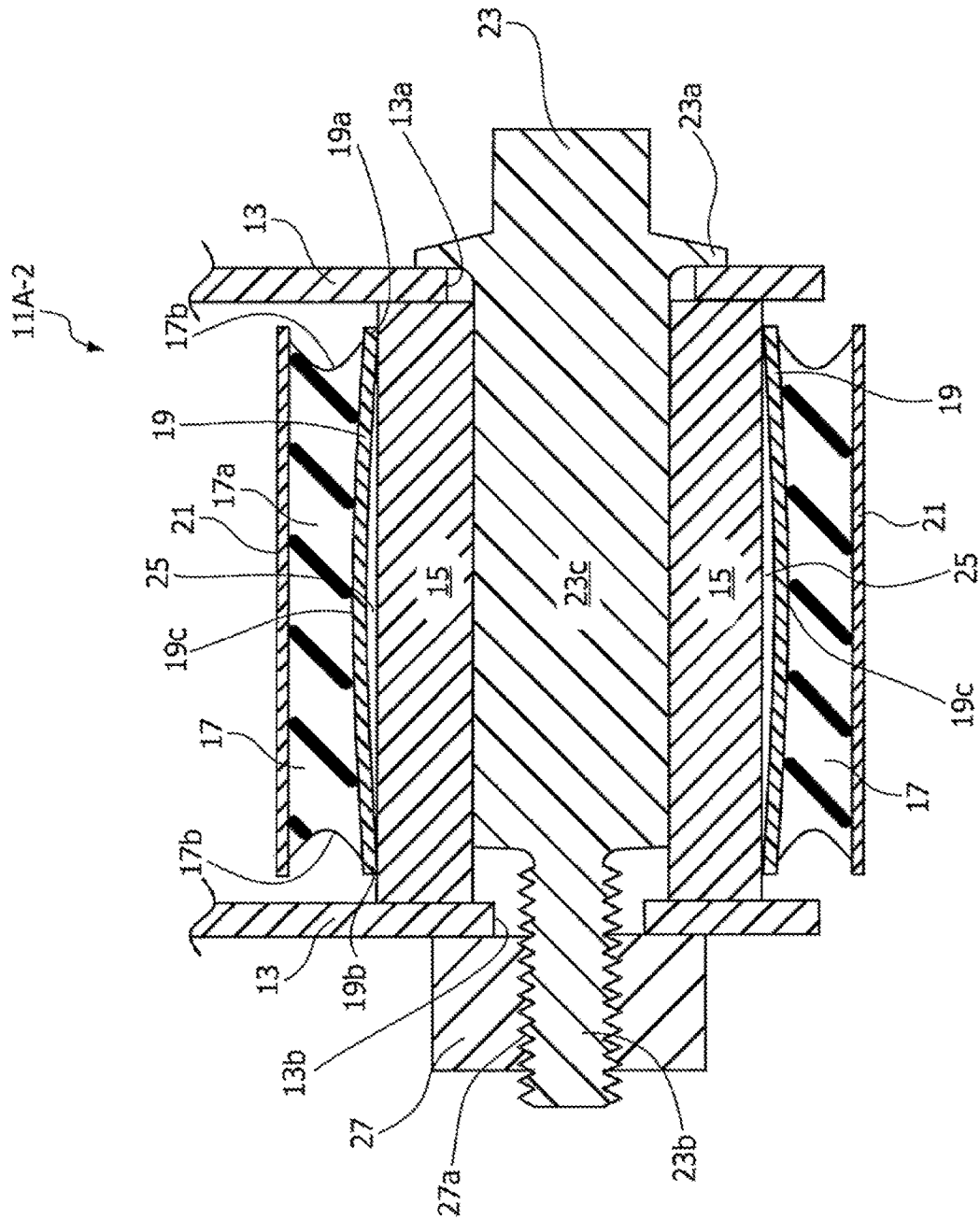
FIG. 2 is a longitudinal cross-sectional diagram illustrating how a bush for a vehicle of a modification of the first embodiment of the present invention is mounted on the yoke portion of the suspension arm.

Next, referring to FIG. 2, descriptions will be provided for a configuration of a bush for a vehicle 11A-2 of a modification of the first embodiment of the present invention. FIG. 2 is a longitudinal cross-sectional diagram illustrating how the bush for a vehicle 11A-2 of the modification of the first embodiment of the present invention is mounted on the yoke portion 13 of the suspension arm.

There are many members whose functions are common to the bush for a vehicle 11A-1 of the first embodiment and the bush for a vehicle 11A-2 of the modification of the first embodiment. For this reason, with focus put on difference between the bush for a vehicle 11A-1 and the bush for a vehicle 11A-2, the bush for a vehicle 11A-2 of the modification of the first embodiment will be described by describing how the bush for a vehicle 11A-2 differs from the bush for a vehicle 11A-1.

The difference between the bush for a vehicle 11A-2 and the bush for a vehicle 11A-1 is how to form the gap portion 25. In the bush for a vehicle 11A-1 of the first embodiment, the gap portion 25 is formed between the outer peripheral surface of the inner cylindrical member 15 on which the taper constricted portion 15a is formed and the flat-shaped inner peripheral surface of the metal spring member 19.

In contrast to this, in the bush for a vehicle 11A-2 of the modification of the first embodiment, the gap portion 25 is formed between the flat-shaped outer peripheral surface of the inner cylindrical member 15 and the inner peripheral surface of the metal spring member 19 on which a taper bulging portion 19c is formed such that the diameter of the taper bulging portion 19c becomes gradually slightly larger from its axial end portions toward its center portion.

As for the bush for a vehicle 11A-2 of the modification of the first embodiment, the inner cylindrical member 15 corresponds to the "cylindrical member" of the present invention. The rest of the configuration of the bush for a vehicle 11A-2 of the modification of the first embodiment is substantially the same as that of the bush for a vehicle 11A-1 of the first embodiment.

(Configuration of a Bush for a Vehicle 11B-1 of a Second Embodiment of the Present Invention)

Figure 3:
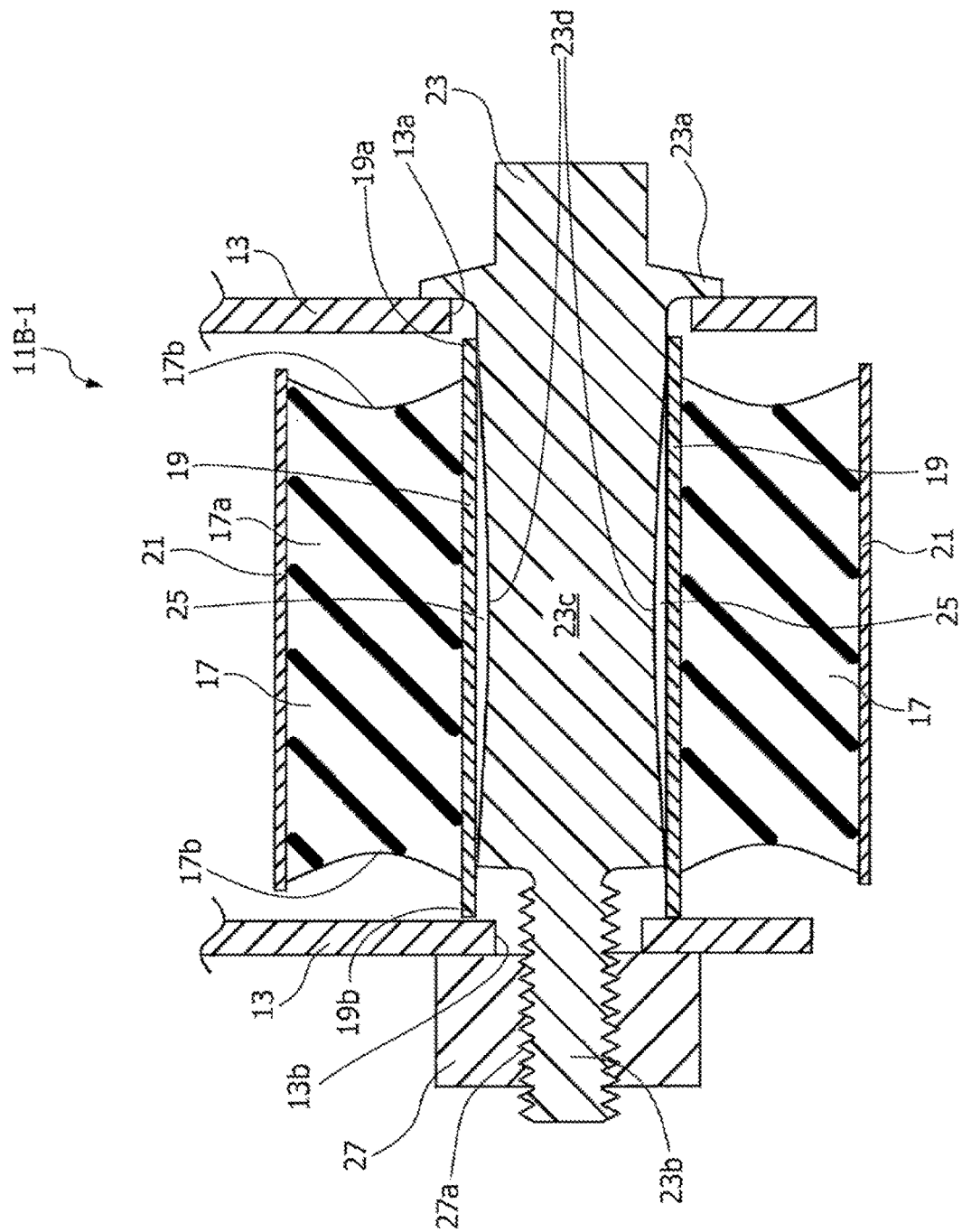
FIG. 3 is a longitudinal cross-sectional diagram illustrating how a bush for a vehicle of a second embodiment of the present invention is mounted on the yoke portion of the suspension arm.

Next, referring to FIG. 3, descriptions will be provided for a configuration of a bush for a vehicle 11B-1 of a second embodiment of the present invention. FIG. 3 is a longitudinal cross-sectional diagram illustrating how the bush for a vehicle 11B-1 of the second embodiment of the present invention is mounted on the yoke portion 13 of the suspension arm.

There are many members whose functions are common to the bush for a vehicle 11A-1 of the first embodiment and the bush for a vehicle 11B-1 of the second embodiment. For this reason, with focus put on difference between the bush for a vehicle 11A-1 and the bush for a vehicle 11B-1, the bush for a vehicle 11B-1 of the second embodiment will be described by describing how the bush for a vehicle 11B-1 differs from the bush for a vehicle 11A-1.

The difference between the bush for a vehicle 11B-1 and the bush for a vehicle 11A-1 is mainly two-fold: whether the inner cylindrical member 15 is present or absent; and how to form the gap portion 25. In the bush for a vehicle 11A-1 of the first embodiment, the inner cylindrical member 15 is used, and the gap portion 25 is formed between the outer peripheral surface of the inner cylindrical member 15 on which the taper constricted portion 15a is formed and the flat-shaped inner peripheral surface of the metal spring member 19.

In contrast to this, in the bush for a vehicle 11B-1 of the second embodiment, the column-shaped shaft portion 23c of the bolt 23 is used instead of the inner cylindrical member 15, and the gap portion 25 is formed between the flat-shaped inner peripheral surface of the metal spring member 19 and the outer peripheral surface of the shaft portion 23c of the bolt 23 on which a taper constricted portion 23d is formed.

It should be noted that: as for the bush for a vehicle 11B-1 of the second embodiment, a method of fixing the one end 19a of the metal spring member 19 to the shaft portion 23c of the bolt 23 is not specifically limited; and for example, a press-fit fixing method may be used.

As for the bush for a vehicle 11B-1 of the second embodiment, the shaft portion 23c of the bolt 23 corresponds to the "columnar member" of the present invention. The rest of the configuration of the bush for a vehicle 11B-1 of the second embodiment is substantially the same as that of the bush for a vehicle 11A-1 of the first embodiment.

(Configuration of a Bush for a Vehicle 11B-2 of a Modification of the Second Embodiment of the Present Invention)

Figure 4:
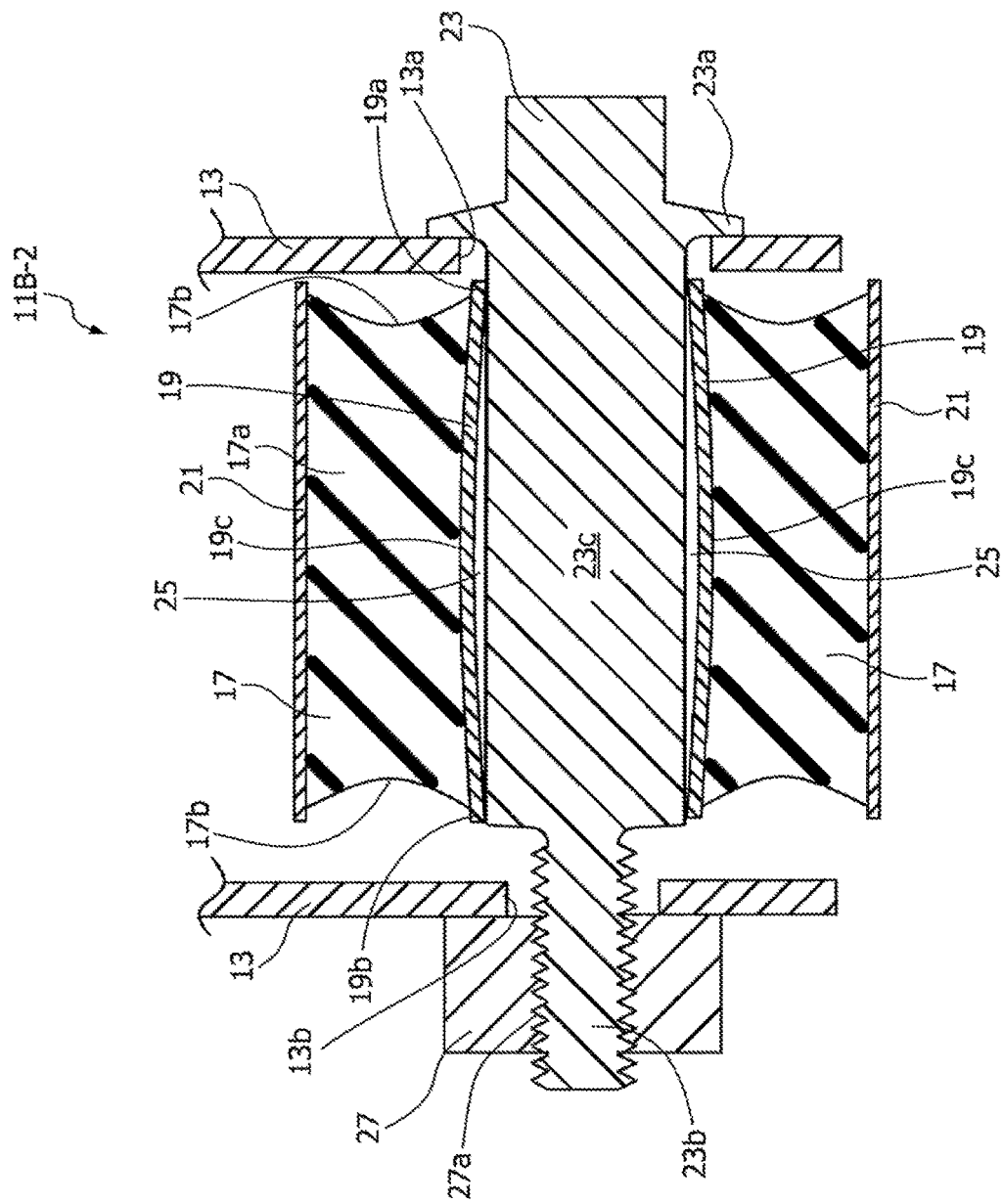
FIG. 4 is a longitudinal cross-sectional diagram illustrating how a bush for a vehicle of a modification of the second embodiment of the present invention is mounted on the yoke portion of the suspension arm.

Next, referring to FIG. 4, descriptions will be provided for a configuration of a bush for a vehicle 11B-2 of a modification of the second embodiment of the present invention. FIG. 4 is a longitudinal cross-sectional diagram illustrating how the bush for a vehicle 11B-2 of the modification of the second embodiment of the present invention is mounted on the yoke portion 13 of the suspension arm.

There are many members whose functions are common to the bush for a vehicle 11B-1 of the second embodiment and the bush for a vehicle 11B-2 of the modification of the second embodiment. For this reason, with focus put on difference between the bush for a vehicle 11B-1 and the bush for a vehicle 11B-2, the bush for a vehicle 11B-2 of the modification of the second embodiment will be described by describing how the bush for a vehicle 11B-2 differs from the bush for a vehicle 11B-1.

The difference between the bush for a vehicle 11B-2 and the bush for a vehicle 11B-1 is how to form the gap portion 25. In the bush for a vehicle 11B-1 of the second embodiment, the gap portion 25 is formed between the flat-shaped inner peripheral surface of the metal spring member 19 and the outer peripheral surface of the shaft portion 23c of the bolt 23 on which the taper constricted portion 23d is formed.

In contrast to this, in the bush for a vehicle 11B-2 of the modification of the second embodiment, the gap portion 25 is formed between the flat-shaped outer peripheral surface of the shaft portion 23c of the bolt 23 and the inner peripheral surface of the metal spring member 19 on which the taper bulging portion 19c is formed such that the diameter of the taper bulging portion 19c becomes gradually slightly larger from its axial end portions toward its center portion.

As for the bush for a vehicle 11B-2 of the modification of the second embodiment, the shaft portion 23c of the bolt 23 corresponds to the "columnar member" of the present invention. The rest of the configuration of the bush for a vehicle 11B-2 of the modification of the second embodiment is substantially the same as that of the bush for a vehicle 11B-1 of the second embodiment.

(Configuration of a Bush for a Vehicle 11C-1 of a Third Embodiment of the Present Invention)

Figure 5:
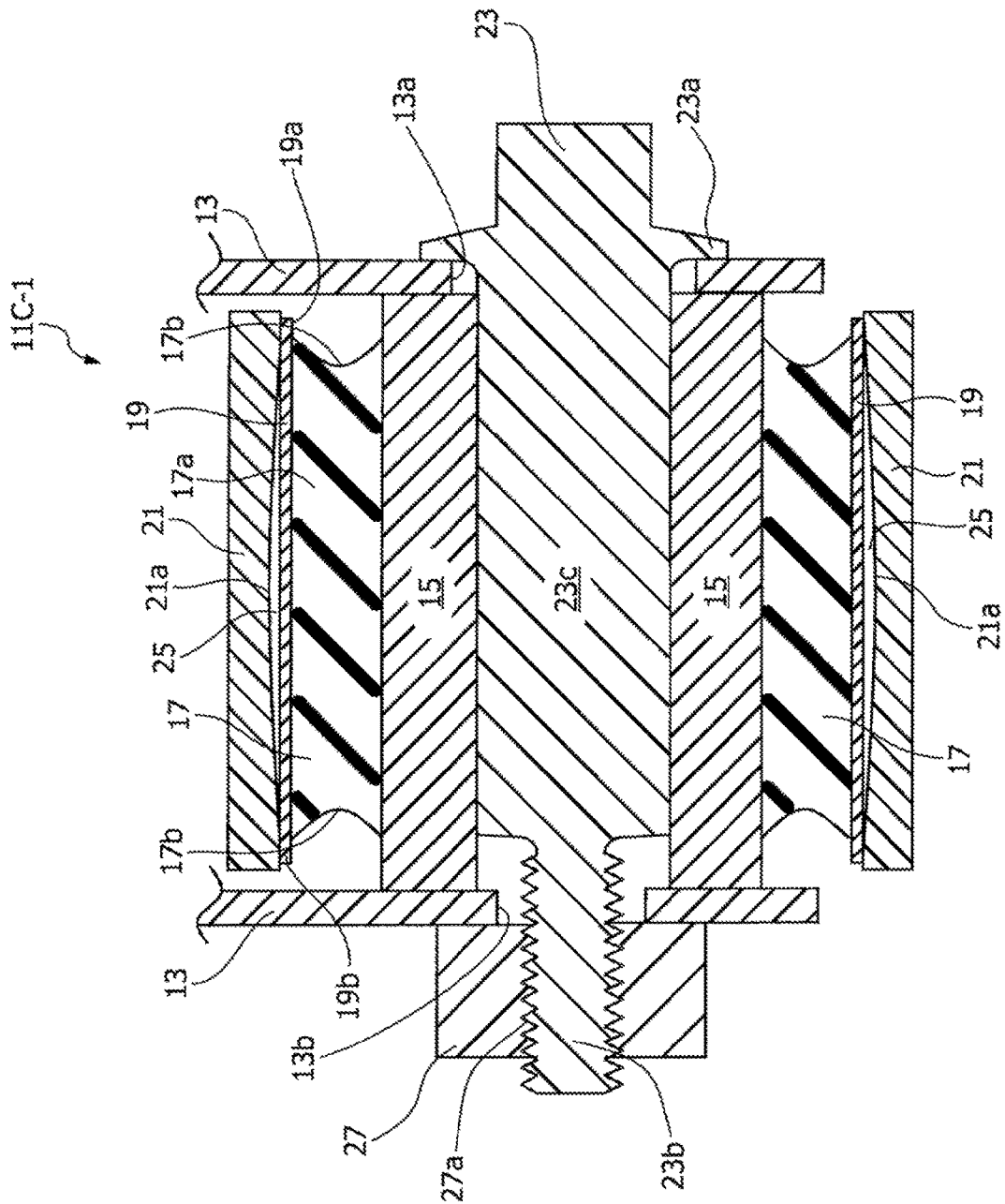
FIG. 5 is a longitudinal cross-sectional diagram illustrating how a bush for a vehicle of a third embodiment of the present invention is mounted on the yoke portion of the suspension arm.

Next, referring to FIG. 5, descriptions will be provided for a configuration of a bush for a vehicle 11C-1 of a third embodiment of the present invention. FIG. 5 is a longitudinal cross-sectional diagram illustrating how the bush for a vehicle 11C-1 of the third embodiment of the present invention is mounted on the yoke portion 13 of the suspension arm.

There are many members whose functions are common to the bush for a vehicle 11A-1 of the first embodiment and the bush for a vehicle 11C-1 of the third embodiment. For this reason, with focus put on difference between the bush for a vehicle 11A-1 and the bush for a vehicle 11C-1, the bush for a vehicle 11C-1 of the third embodiment will be described by describing how the bush for a vehicle 11C-1 differs from the bush for a vehicle 11A-1.

The difference between the bush for a vehicle 11C-1 and the bush for a vehicle 11A-1 is two-fold: where to arrange the metal spring member 19; and where to arrange the gap portion 25. In the bush for a vehicle 11A-1 of the first embodiment, the metal spring member 19 is arranged inside the inner periphery of the rubber member 17. Furthermore, the inner cylindrical member 15 is used, and the gap portion 25 is formed between the outer peripheral surface of the inner cylindrical member 15 on which the taper constricted portion 15a is formed and the flat-shaped inner peripheral surface of the metal spring member 19.

In contrast to this, in the bush for a vehicle 11C-1 of the third embodiment, the metal spring member 19 is arranged outside the outer periphery of the rubber member 17. Furthermore, the outer cylindrical member 21 is used instead of the inner cylindrical member 15, and the gap portion 25 is formed between the flat-shaped outer peripheral surface of the metal spring member 19 and the inner peripheral surface of the outer cylindrical member 21 on which a taper constricted portion 21a is formed.

It should be noted that: as for the bush for a vehicle 11C-1 of the third embodiment, the one end 19a of the metal spring member 19 is welded and fixed to the inner peripheral surface of the outer cylindrical member 21. The other end 19b of the metal spring member 19 is provided to the outer cylindrical member 21 with the assistance of a mechanism (not illustrated), such as a key groove, which inhibits the rotational movement of the metal spring member 19 and allows the movement of the metal spring member 19 in the axial direction.

As for the bush for a vehicle 11C-1 of the third embodiment, the outer cylindrical member 21 corresponds to the "cylindrical member" of the present invention. The rest of the configuration of the bush for a vehicle 11C-1 of the third embodiment is substantially the same as that of the bush for a vehicle 11A-1 of the first embodiment.

(Configuration of a Bush for a Vehicle 11C-2 of a Modification of the Third Embodiment of the Present Invention)

Figure 6:
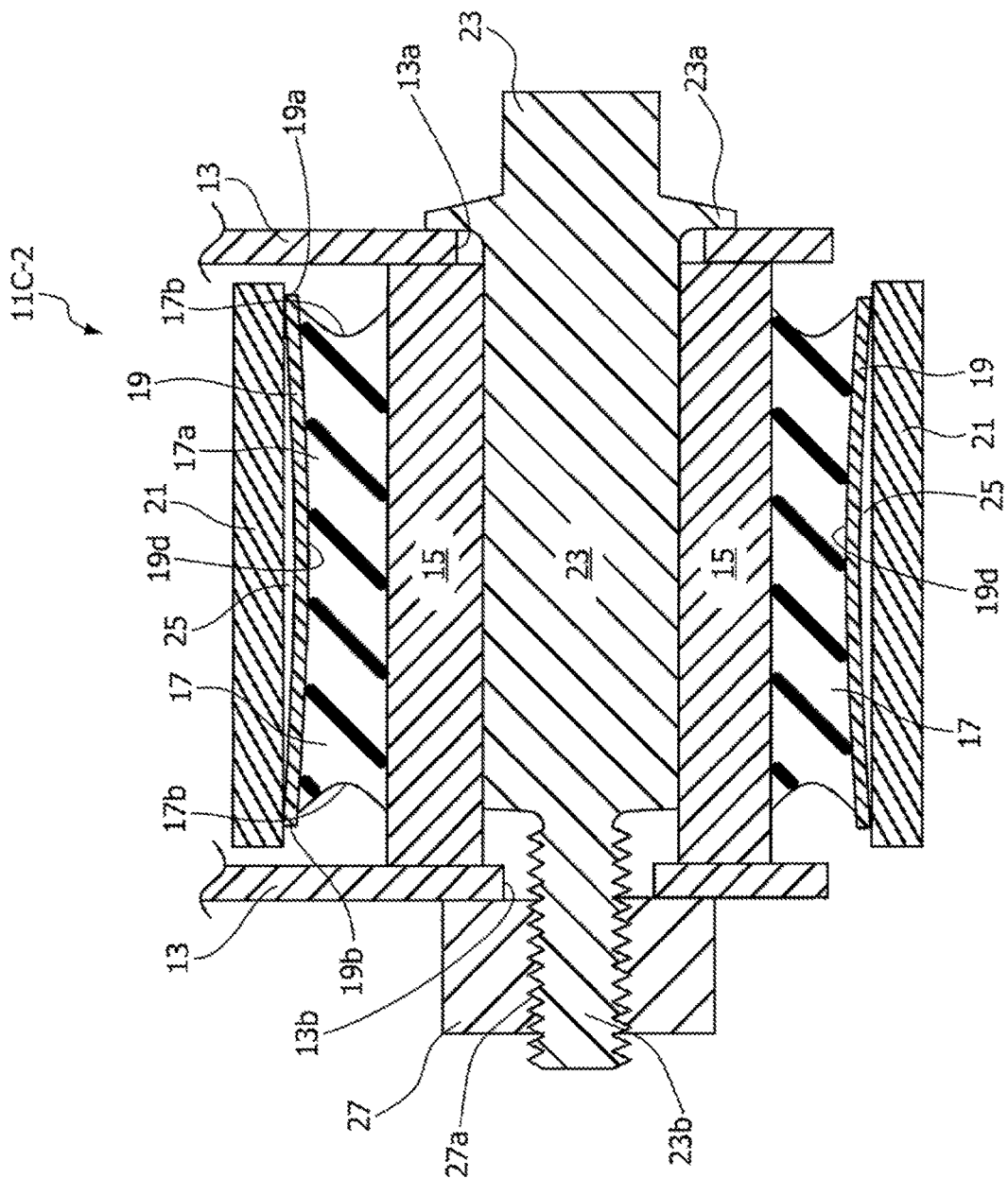
FIG. 6 is a longitudinal cross-sectional diagram illustrating how a bush for a vehicle of a modification of the third embodiment of the present invention is mounted on the yoke portion of the suspension arm.

Next, referring to FIG. 6, descriptions will be provided for a configuration of a bush for a vehicle 11C-2 of a modification of the third embodiment of the present invention. FIG. 6 is a longitudinal cross-sectional diagram illustrating how the bush for a vehicle 11C-2 of the modification of the third embodiment of the present invention is mounted on the yoke portion 13 of the suspension arm.

There are many members whose functions are common to the bush for a vehicle 11C-1 of the third embodiment and the bush for a vehicle 11C-2 of the modification of the third embodiment. For this reason, with focus put on difference between the bush for a vehicle 11C-1 and the bush for a vehicle 11C-2, the bush for a vehicle 11C-2 of the modification of the third embodiment will be described by describing how the bush for a vehicle 11C-2 differs from the bush for a vehicle 11C-1.

The difference between the bush for a vehicle 11C-2 and the bush for a vehicle 11C-1 is how to form the gap portion 25. In the bush for a vehicle 11C-1 of the third embodiment, the gap portion 25 is formed between the flat-shaped outer peripheral surface of the metal spring member 19 and the inner peripheral surface of the outer cylindrical member 21 on which the taper constricted portion 21a is formed.

In contrast to this, in the bush for a vehicle 11C-2 of the modification of the third embodiment, the gap portion 25 is formed between the flat-shaped inner peripheral surface of the outer cylindrical member 21 and the outer peripheral surface of the metal spring member 19 on which a taper constricted portion 19d is formed such that its diameter becomes gradually slightly smaller from its axial end portions toward its center portion.

As for the bush for a vehicle 11C-2 of the modification of the third embodiment, the outer cylindrical member 21 corresponds to the "cylindrical member" of the present invention. The rest of the configuration of the bush for a vehicle 11C-2 of the modification of the third embodiment is substantially the same as that of the bush for a vehicle 11C-1 of the third embodiment.

(Overall Working/Effects of a Bush for a Vehicle 11 of the Present Invention)

Figure 7:
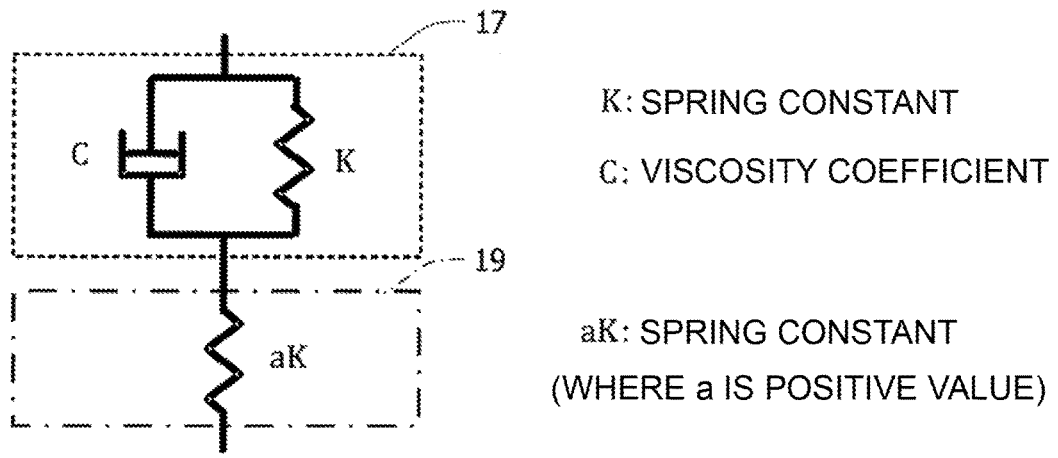
FIG. 7 is a concept diagram representing the bush for a vehicle of the present invention by use of a mechanical model.
Figure 8:
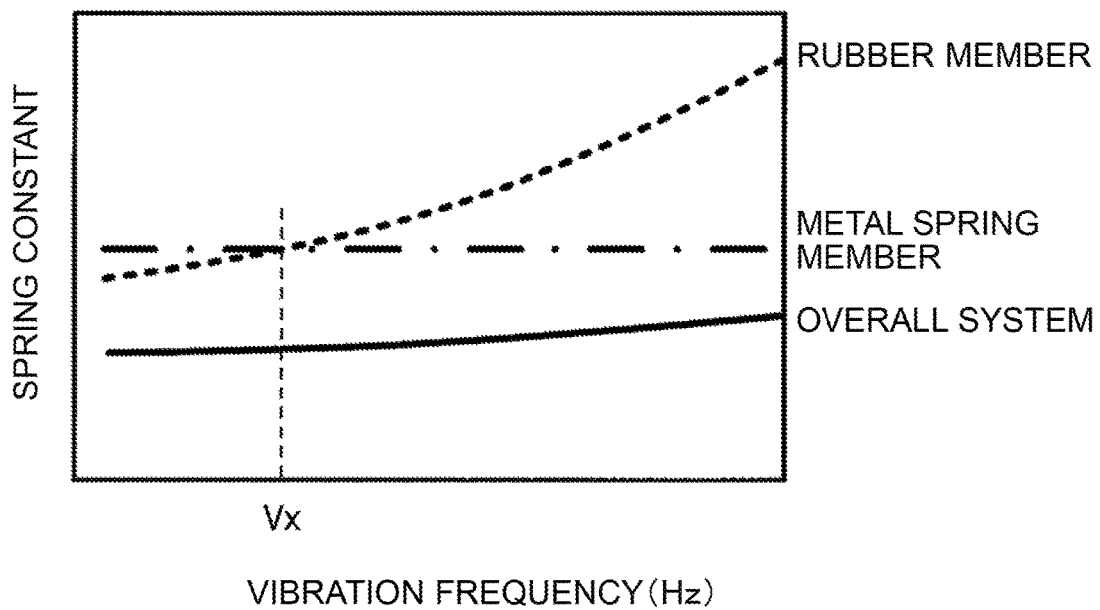
FIG. 8 is a characteristic diagram showing how the spring constants of a rubber member and a metal member included in the bush for a vehicle of the present invention, as well as the spring constant of the overall system, change in response to a change in a vibration frequency.

Next, referring to FIGS. 7 and 8, descriptions will be provided for how a bush for vehicle 11 of the present invention works (the bush for a vehicle 11 of the present invention is a generic term for the bushes for a vehicle of the first to third embodiments and their modifications). FIG. 7 is a concept diagram representing the bush for a vehicle 11 of the present invention by use of a mechanical model. FIG. 8 is a characteristic diagram showing how the spring constants of the rubber member 17 and the metal spring member 19 included in the bush for a vehicle 11 of the present invention, as well as the spring constant of the overall system, change in response to a change in a vibration frequency.

The bush for a vehicle 11 of the present invention can be represented using a mechanical model of the configuration illustrated in FIG. 7. The mechanical model is generally termed a three-element solid model. In the mechanical model, as illustrated in FIG. 7, the rubber member 17 is represented by a spring element with a spring constant K and a dashpot with a viscosity coefficient C which are connected together in parallel. Meanwhile, the metal spring member 19 is represented by a spring element with a spring constant aK (where a is a positive value).

From an examination of the working of the overall system (which includes the rubber member 17 and the metal spring member 19) by referring to the mechanical model, it is learned that in the bush for a vehicle 11 of the present invention, the in-series arrangement of the spring element with the spring constant K and the spring element with the spring constant aK makes a spring constant K(T) of the overall system smaller than a smaller one between the spring constant K and the spring constant aK.

In this respect, as illustrated in FIG. 8, the spring constant of the metal spring member 19 is set substantially equal to the spring constant of the rubber member 17 around a predetermined vibration frequency Vx (which is a vibration frequency set changeably depending on the necessity, and is around 100 Hz, for example). In other words, as illustrated in FIG. 8, the spring constant of the rubber member 17 and the spring constant of the metal spring member 19 are set in a relationship that: in a vibration frequency area lower than the predetermined vibration frequency Vx, the spring constant of the metal spring member 19 is higher than the spring constant of the rubber member 17; and in a vibration frequency area higher than the predetermined vibration frequency Vx, the spring constant of the rubber member 17 is higher than the spring constant of the metal spring member 19.

Unlike the spring constant of the rubber member 17, the spring constant of the metal spring member 19 is not dependent on a change in the vibration frequency. For this reason, in the vibration frequency area higher than the predetermined vibration frequency Vx, the metal spring member 19 plays a main role of the vibration damping, and makes it possible to obtain a better damping effect than when the rubber member 17 is used solely.

In short, in the bush for a vehicle 11 of the present invention, the gap portion 25 which allows the metal spring member 19 to be elastically deformed in the radial direction is provided between the cylindrical member (the inner cylindrical member 15 and the outer cylindrical member 21) and the metal spring member 19. Thus, the bush for a vehicle 11 of the present invention works such that: when impact force belonging to the vibration frequency area lower than the predetermined vibration frequency Vx or impact force resultantly accompanied with great displacement is inputted into the bush for a vehicle 11, mainly the rubber member 17 absorbs vibrations; and when impact force belonging to the vibration frequency area higher than the predetermined vibration frequency Vx is inputted into the bush for a vehicle 11, mainly the metal spring member 19 absorbs vibrations.

The bush for a vehicle 11 of the present invention is capable of: securing the NV performance regardless of whether the vibration frequency is high or low; and maintaining good ride comfort.

In addition, for example, in the bush for a vehicle 11A-1 of the first embodiment, the gap between the inner cylindrical member 15 and the metal spring member 19 may be set at an appropriate value with taken into account that: the gap is equal to or greater than 0.05 mm (preferably equal to or greater than 1 mm) which corresponds to a maximum audible sound pressure 120 dB around the vibration frequency Vx; and the gap prevents the occurrence of a displacement which adversely affects the vibration damping. In this respect, it also may be taken into account that: the metal spring member 19 works mainly to damp vibrations; and the rubber member 17 plays a role of damping an unsteady large input.

It should be noted that for the bush for a vehicle 11 of each of the modification of the first embodiment, the second and third embodiments, as well as their modifications, the same guideline as discussed above may be taken into account when the dimension of the gap in the gap portion 25 is set.

As for the bush for a vehicle 11 of the present invention, it is desirable that the maximum stroke of the metal spring member 19 be set as small as possible within a range where the metal spring member 19 is capable of performing the vibration damping effect in the vibration frequency area greater than the predetermined vibration frequency Vx. This configuration makes it possible to obtain excellent NV performance with little influence on deformation behavior of the bush for a vehicle 11. This configuration also makes it possible to inhibit an increase in vibrations around the natural vibration frequency to as low a level as possible. After the metal spring member 19 uses up its full stroke within an elastic range due to the application of a sudden large input, the rubber member 17 can behave solely (without its combination with the metal spring member 19).

(Working/Effects of the Bush for a Vehicle 11 of Each of the First to Third Embodiments (Including their Modifications) of the Present Invention)

In the bush for a vehicle 11A-1 of the first embodiment, the gap portion 25 is provided between the outer peripheral surface of the inner cylindrical member 15 (the cylindrical member) on which the taper constricted portion 15a is formed and the flat-shaped inner peripheral surface of the metal spring member 19.

Furthermore, in the bush for a vehicle 11A-2 of the modification of the first embodiment, the gap portion 25 is provided between the flat-shaped outer peripheral surface of the inner cylindrical member 15 and the inner peripheral surface of the metal spring member 19 on which the taper bulging portion 19c is formed such that the diameter of the taper bulging portion 19c becomes gradually slightly larger from its axial end portions toward its center portion.

The bushes for a vehicle 11A-1, 11A-2 of the first embodiment (including its modification) are capable of: securing the NV performance regardless of whether the vibration frequency is high or low; and maintaining good ride comfort. Furthermore, since the gap portion 25 is provided between the inner cylindrical member 15 (which is a part independent of the shaft portion 23c of the bolt 23) and the metal spring member 19, the gap portion 25 can be handled as a part to be formed when the inner cylindrical member 15, the rubber member 17, the metal spring member 19 and the outer cylindrical member 21 are assembled together. Accordingly, the adjustment of the gap dimension of the gap portion 25, and the maintenance of the gap portion 25 can be performed more easily than otherwise.

In the bush for a vehicle 11B-1 of the second embodiment, the shaft portion 23c (the columnar member) of the bolt 23 is used instead of the inner cylindrical member 15, and the gap portion 25 is formed between the flat-shaped inner peripheral surface of the metal spring member 19 and the outer peripheral surface of the shaft portion 23c of the bolt 23 on which the taper constricted portion 23d is formed.

Furthermore, in the bush for a vehicle 11B-2 of the modification of the second embodiment, the gap portion 25 is formed between the inner peripheral surface of the metal spring member 19 on which the taper bulging portion 19c is formed and the flat-shaped outer peripheral surface of the shaft portion 23c of the bolt 23.

The bushes for a vehicle 11B-1, 11B-2 of the second embodiment (including its modification) are capable of: securing the NV performance regardless of whether the vibration frequency is high or low; and maintaining good ride comfort. Furthermore, since the shaft portion 23c (the columnar member) of the bolt 23 is used in return for the elimination of the inner cylindrical member 15 and the gap portion 25 is provided between the metal spring member 19 and the shaft portion 23c of the bolt 23, an effect of reducing the number of needed parts and the weight can be expected from the elimination of the inner cylindrical member 15.

In the bush for a vehicle 11C-1 of the third embodiment, the metal spring member 19 is arranged outside the outer periphery of the rubber member 17. Furthermore, the outer cylindrical member 21 is used instead of the inner cylindrical member 15, and the gap portion 25 is formed between the flat-shaped outer peripheral surface of the metal spring member 19 and the inner peripheral surface of the outer cylindrical member 21 on which the taper constricted portion 21a is formed.

Moreover, in the bush for a vehicle 11C-2 of the modification of the third embodiment, the gap portion 25 is formed between the outer peripheral surface of the metal spring member 19 on which the taper constricted portion 19d is formed and the flat-shaped inner peripheral surface of the outer cylindrical member 21.

The bushes for a vehicle 11C-1, 11C-2 of the third embodiment (including its modification) are capable of: securing the NV performance regardless of whether the vibration frequency is high or low; and maintaining good ride comfort. Besides, since the gap portion 25 is provided between the metal spring member 19 and the outer cylindrical member 21 (which is apart independent of the shaft portion 23c of the bolt 23), the gap portion 25 can be handled as apart to be formed when the inner cylindrical member 15, the rubber member 17, the metal spring member 19 and the outer cylindrical member 21 are assembled together. Accordingly, the adjustment of the gap dimension of the gap portion 25, and the maintenance of the gap portion 25 can be performed more easily than otherwise.

(Other Embodiments)

The above-discussed embodiments represent the carried-out examples of the present invention. For this reason, the technical scope of the present invention shall not be limitedly construed due to the above-discussed embodiments. This is because the present invention can be carried out in various modes without departing from the gist or main features of the present invention.

For example, although the embodiments of the bush for a vehicle 11 of the present invention have been described citing the example where the bush for a vehicle 11 is mounted on the yoke portion 13 of the suspension arm included in the vehicle suspension apparatus, the present invention is not limited to this example. The bush for a vehicle 11 of the present invention is applicable to a vehicle engine mount and other sections which cause vibrations and noises.

What is claimed is:

1. A bush for a vehicle, comprising:
a cylindrical member;
a substantially cylindrical rubber member provided inside or outside the cylindrical member; and
a substantially cylindrical metal spring member inserted between the cylindrical member and the rubber member, wherein
a gap portion for allowing the metal spring member to be elastically deformed in a radial direction of the metal spring member is provided between the cylindrical member and the metal spring member,
wherein a spring constant of the rubber member and a spring constant of the metal spring member are set in a relationship that: in a vibration frequency area lower than a predetermined vibration frequency, the spring constant of the metal spring member is higher than the spring constant of the rubber member; and in a vibration frequency area higher than the predetermined vibration frequency, the spring constant of the rubber member is higher than the spring constant of the metal spring member.

2. A bush for a vehicle, comprising:
a cylindrical member;
a substantially cylindrical rubber member provided inside or outside the cylindrical member; and
a substantially cylindrical metal spring member inserted between the cylindrical member and the rubber member, wherein
a gap portion for allowing the metal spring member to be elastically deformed in a radial direction of the metal spring member is provided between the cylindrical member and the metal spring member, wherein
the gap portion is formed between a flat-shaped outer peripheral surface of the metal spring member and a peripheral surface of the cylindrical member on which a taper constricted portion is formed,
wherein an end of the metal spring member is fixed to the cylindrical member whereas an opposite end of the metal spring member is disposed at the cylindrical member via a mechanism which allows movement of the metal spring member in its axial direction.

3. A bush for a vehicle, comprising:
a cylindrical member;
a substantially cylindrical rubber member provided inside or outside the cylindrical member; and
a substantially cylindrical metal spring member inserted between the cylindrical member and the rubber member, wherein
a gap portion for allowing the metal spring member to be elastically deformed in a radial direction of the metal spring member is provided between the cylindrical member and the metal spring member, wherein
the gap portion is formed between a flat-shaped outer peripheral surface of the metal spring member and a peripheral surface of the cylindrical member on which a taper constricted portion is formed,
wherein the cylindrical member includes the taper constricted portion of which diameter becomes gradually smaller from its axial end toward its center.

4. The bush for a vehicle according to claim 3, wherein a spring constant of the rubber member and a spring constant of the metal spring member are set in a relationship that: in a vibration frequency area lower than a predetermined vibration frequency, the spring constant of the metal spring member is higher than the spring constant of the rubber member; and in a vibration frequency area higher than the predetermined vibration frequency, the spring constant of the rubber member is higher than the spring constant of the metal spring member.

5. A bush for a vehicle, comprising:
a cylindrical member;
a substantially cylindrical rubber member provided inside the cylindrical member; and
a substantially cylindrical metal spring member inserted between the cylindrical member and the rubber member, wherein
a gap portion for allowing the metal spring member to be elastically deformed in a radial direction of the metal spring member is provided between the cylindrical member and the metal spring member, wherein
the metal spring member is arc-shaped in a longitudinal cross-section, the gap portion is formed between a flat-shaped inner peripheral surface of the cylindrical member and an outer peripheral surface of the metal spring member on which a taper constricted portion is formed such that a diameter of the metal spring member becomes gradually smaller from its axial ends toward its center.

6. The bush for a vehicle according to claim 5, wherein an end of the metal spring member is fixed to the cylindrical member whereas an opposite end of the metal spring member is disposed at the cylindrical member via a mechanism which allows movement of the metal spring member in its axial direction.

7. The bush for a vehicle according to claim 5, wherein a spring constant of the rubber member and a spring constant of the metal spring member are set in a relationship that: in a vibration frequency area lower than a predetermined vibration frequency, the spring constant of the metal spring member is higher than the spring constant of the rubber member; and in a vibration frequency area higher than the predetermined vibration frequency, the spring constant of the rubber member is higher than the spring constant of the metal spring member.

* * * * *